(12) United States Patent
Ikechi et al.

(10) Patent No.: US 8,313,816 B2
(45) Date of Patent: Nov. 20, 2012

(54) METHOD FOR MANUFACTURING RETICULATE CONTACT BODY ELEMENTS AND A ROTATING CIRCULAR RETICULATE CONTACT BODY USING THEM

(75) Inventors: Hiromi Ikechi, Kodaira (JP); Tadashi Ikechi, Musashimurayama (JP); Akira Ikechi, Saitama (JP)

(73) Assignee: Hiromi Ikechi, Tokyo (JP)

( * ) Notice: Subject to any disclaimer, the term of this patent is extended or adjusted under 35 U.S.C. 154(b) by 292 days.

(21) Appl. No.: 12/066,257

(22) PCT Filed: Sep. 13, 2007

(86) PCT No.: PCT/JP2007/067865
§ 371 (c)(1),
(2), (4) Date: Jun. 7, 2010

(87) PCT Pub. No.: WO2009/034635
PCT Pub. Date: Mar. 19, 2009

(65) Prior Publication Data
US 2010/0247837 A1     Sep. 30, 2010

(51) Int. Cl.
*C02F 3/08* (2006.01)
*C02F 3/10* (2006.01)

(52) U.S. Cl. ........ 428/57; 428/66.6; 428/66.7; 366/315; 366/316; 156/161

(58) Field of Classification Search ............... 428/53, 428/57, 60, 66.6, 66.7; 156/161; 264/138, 264/154, 320, 324; 366/315, 316
See application file for complete search history.

(56) References Cited

FOREIGN PATENT DOCUMENTS

| JP | 113600 | 4/1989 |
|---|---|---|
| JP | 116559 | 5/1989 |
| JP | 123594 | 7/1989 |
| JP | 3064723 | 9/1999 |

*Primary Examiner* — Alexander Thomas
(74) *Attorney, Agent, or Firm* — K. David Crockett, Esq.; Paul J. Backofen, Esq.; Crockett & Crockett, PC

(57) ABSTRACT

A method for manufacturing a reticular contact body element includes the process of manufacturing a rotating circular reticulate contact body element 4 by cutting and processing a synthetic resin fiber block that is formed by gluing the intersections of fiber yarn formed in the shape of a three-dimensional reticulum, cutting the synthetic resin fiber block to form fan shapes, making through holes 20 in the fan-shaped reticulate contact body element precursor, forming compression sections 25 by compressing the periphery 21 of the reticulate contact body element precursor and the circumferences of the through holes 20 with a hot press machine, hot-pressing the whole face of the reticulate contact body element precursor except its periphery 21 and the circumferences of the through holes 20 with the hot press machine at temperatures of 90-140° C. to make the void of the whole face of the reticulate contact body element precursor no less than 90% and no more than 98%; and promoting crystallization of the synthetic fiber by giving a rest period of no less than five days after the reticular contact body element has been hot-pressed.

20 Claims, 3 Drawing Sheets

METHOD FOR MANUFACTURING RETICULATE CONTACT BODY ELEMENTS AND A ROTATING CIRCULAR RETICULATE CONTACT BODY USING THEM

TECHNICAL FIELD

The present invention relates to a method for manufacturing a reticulate contact body element usable for contact bio-treatment of waste water and a rotating circular reticulate contact body usable for contact bio-treatment of waste water and, more particularly, a method for manufacturing a reticulate contact body element excellent in strength and applicable to long-term treatment of waste water and a rotating circular reticulate contact body using the reticulate contact body elements.

BACKGROUND ART

The apparatus for treating organic matter present in waste water by installing rotating circular reticulate contact bodies made from reticulate resin fiber yarn on the main shaft in a contact tank, soaking the rotating circular reticulate contact bodies partly in liquid in the contact tank, rotating it and making microorganisms adhere to resin fiber yarn surfaces and propagate is already known. (Refer to the patent documents 1, 2 and 3.)

Application of such special rotating circular reticulate contact bodies has made it possible to feed adequate oxygen as well as nutrient sources to microorganisms, increase the area of contact between animate beings and organic matter and provide a heavily-loaded treatment.

The patent document 4 discloses the technology for manufacturing fan-shaped reticulate contact body elements by dividing a disc into six sectors to form special rotating circular reticulate contact body elements and a method for forming through holes through which spacers and reinforcing rods can pass and forming compression sections by compressing the periphery of a fan-shaped block and the circumferences of through holes.

Patent document 1: Utility Model Gazette No. H1-23594
Patent document 2: Utility Model Gazette No. H1-13600
Patent document 3: Utility Model Gazette No. H1-16559
Patent document 4: Registered Utility Model No. 3064723

SUMMARY OF THE INVENTION

Problems to be Solved by the Invention

However, while the method described in the patent document 4 discloses the fact of compressing the periphery of the fan-shaped block and the circumferences of the through holes, it does not disclose temperature conditions relative to the operation of a hot press machine at all.

The inventor of the present invention studied hard to improve the process disclosed in the patent document 4 further and, as a result, has found that hot pressing only the periphery of the fan-shaped block (hereinafter referred to as "reticulate contact body element precursor") and the circumferences of the through holes in the fan-shaped block is not enough for achieving adequate strength in order to use a finished rotating circular reticulate contact body for the treatment of waste water and there is room for improvement to secure a long term operation when the rotating circular reticulate contact body is applied to the treatment of waste water.

And thus, the problem to be solved by the present invention is to provide a method for manufacturing a reticulate contact element excellent in strength and applicable to long-term treatment of waste water and a rotating circular reticulate contact body using them.

Other problems to be solved by the present invention will be disclosed by the descriptions provided herebelow.

The abovementioned problems can be solved by the following inventions:

The invention described in claim 1 provides the method for manufacturing a reticular contact body element consisting of the process of manufacturing a rotating circular reticulate contact body element by cutting and processing a synthetic resin fiber block that is formed by gluing the intersections of fiber yarn formed in the shape of a three-dimensional reticulum comprising:

The process of cutting the synthetic resin fiber block to form fan shapes by dividing a disc-shaped body equally in radial direction;

The process of making through holes in the fan-shaped reticulate contact body element precursor to insert spacers through;

The process of forming compression sections by compressing the periphery of the reticulate contact body element precursor and the circumferences of the through holes with a hot press machine;

The process of hot-pressing the whole face of the reticulate contact body element precursor except its periphery and the circumferences of the through holes with the hot press machine at temperatures of 90-140° C. to make the void of the whole face of the reticulate contact body element precursor except its periphery and the circumferences of the through holes no less than 90% and no more than 98%; and The process of promoting crystallization of the synthetic fiber by giving a rest period of no less than five days after it has been hot-pressed.

The invention described in claim 2 provides the method for manufacturing the reticulate contact body element as set forth in claim 1, in which the temperature of the contact surface of the hot press machine for hot-pressing the whole face of the reticulate contact body element precursor with the hot press machine is adjusted to 100-140° C.

The invention described in claim 3 provides the method for manufacturing the reticulate contact body element as set forth in claim 1, in which the temperature of the contact surface of the hot press machine for hot-pressing the whole face of the reticulate contact body element precursor with the hot press machine is adjusted to 120-140° C.

The invention described in claim 4 provides the method for manufacturing the reticulate contact body element as set forth in claim 1, 2 or 3, in which the ratio between the yarn weight F of the reticulate contact body element and the weight L of the adhesive is in the range of 50-60:50-40.

The invention described in claim 5 provides the method for manufacturing the reticulate contact body element as set forth in claim 1, 2, 3 or 4, in which the rest period is no less than eight days and no more than ten days.

The invention described in claim 6 provides a rotating circular reticulate contact body comprising a plurality of the reticulate contact body elements combined and assembled into a circle after being manufactured according to the method for manufacturing the reticulate contact body element as set forth in claim 1, 2, 3, 4 or 5.

The present invention secures that the method for manufacturing a reticulate contact body element free from run of fiber yarn, excellent in strength and applicable to long-term treatment of waste water and the rotating circular reticulate contact body using the reticulate contact body elements can be provided because the present invention adopts the process of hot-pressing the whole area of the reticulate contact element precursor except its periphery and the circumferences of the through holes under the temperature conditions of 90 to 140° C. with a hot press machine so that the void of the said whole face having the exceptions may be no less than 90% and no more than 98%.

In addition, the present invention adopts a process of promoting crystallization of synthetic fiber that has been thermally compressed as aforementioned by giving a rest period of no less than 5 days after it has been hot-pressed to produce an effect of advancing crystallization and increasing the strength of the resin yarn further. Conventionally, the reticulate contact body element precursors have been shipped and transported in two or three days after being hot-pressed (since delivery is predetermined); when they are rocked during transportation before they have been completely crystallized, yarn may run. These problems can be completely solved by the present invention.

Figure 1:
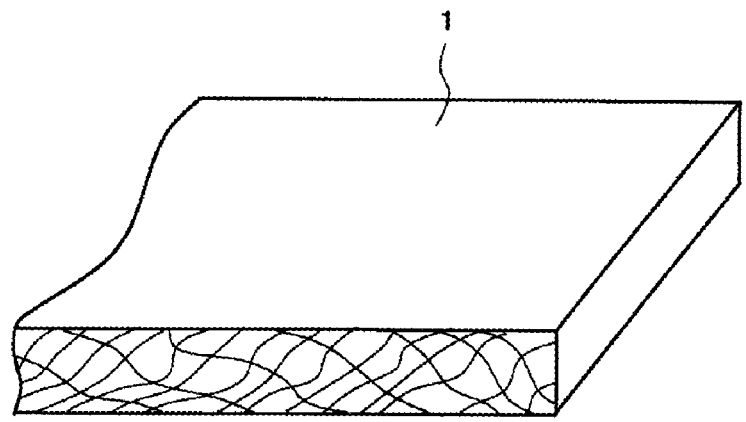
FIG. 1 is a perspective view of the principal part of a synthetic resin fiber block.

| EXPLANATIONS OF LETTERS OR NUMERALS | |
|---|---|
| 1: | synthetic resin fiber block |
| 2: | reticulate contact body element precursor |
| 20: | through hole |
| 21: | periphery |
| 22: | whole face except the circumferences of the through holes |
| 25: | compression section |
| 3: | hot press machine |
| 4: | reticulate contact body element |
| 30: | rotating circular reticulate contact body |
| 50: | contact tank |
| 51: | aeration tube |
| 52: | cover |
| 53: | inspection hole |
| 54: | platform |
| 55: | spacer |
| 56: | main shaft |
| 57: | supporting plate |
| 58: | driving source |
| 59: | motor |
| 60: | power transmission system |
| 61: | bearings |

DETAILED DESCRIPTION OF THE INVENTIONS

Referring now to the drawings, the embodiment of the present invention is explained as follows:

As shown in FIG. 1 that is a perspective view of the principal part of the synthetic resin fiber block, the synthetic resin fiber block 1 is configured to have synthetic fiber yarn in the shape of a three-dimensional reticulum. This synthetic resin fiber block 1 is an original fabric from which the rotating reticulate contact body of the present invention is manufactured, and the intersection of the fiber yarn is glued.

The material of the synthetic fiber yarn is not especially defined; however, thermoplastic resin is preferable and, more particularly, vinylidene chloride resin is preferable. If vinylidene chloride resin is used, the fiber yarn thickness is preferably in the range of 3800-4200 denier and, more preferably, in the range of 3900-4100 denier.

The adhesive may be of latex in general; however, vinylidene chloride resin adhesive is preferably chosen for gluing vinylidene chloride fiber yarn.

Figure 2:
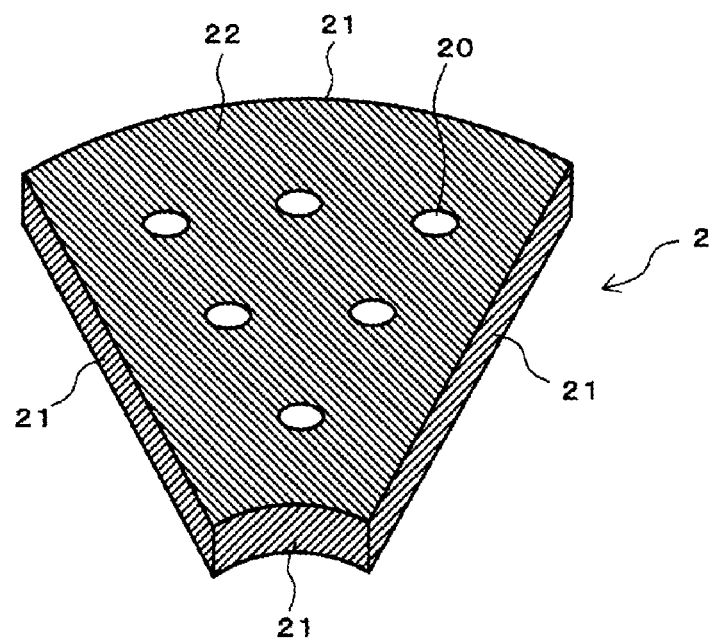
FIG. 2 is a perspective view showing an example of the reticulate contact body element precursor.

The first process to be followed in the present invention is the process of cutting and processing the aforementioned synthetic resin fiber block 1 to produce the reticulate contact body precursor 2 shown in FIG. 2. The reticulate contact body precursor 2 is formed to have a fan shape which is made up by dividing a disc equally in radial direction. Though in the illustrated example the disc is divided into six, the number of division is not especially defined.

Simultaneously with or subsequently to this cutting and processing process, the through holes 20 are made in the fan-shaped reticulate contact body element precursor 2. The through holes 20 have not to be circular, but may be square-shaped, and the number of them is not limited to the one as illustrated. The through holes 20 serve as spacer installing holes as mentioned hereafter.

Figure 3:
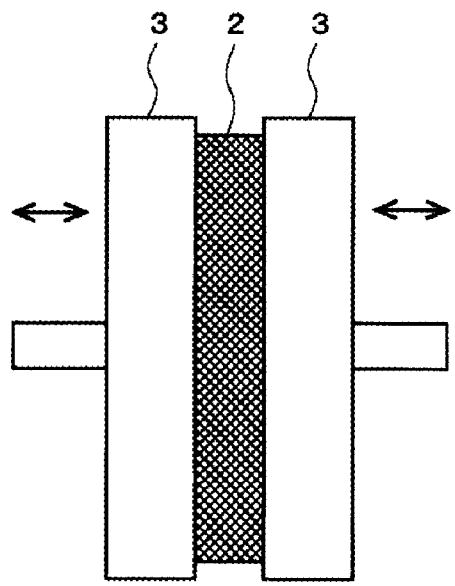
FIG. 3 shows the state of hot pressing with a hot press machine.
Figure 4:
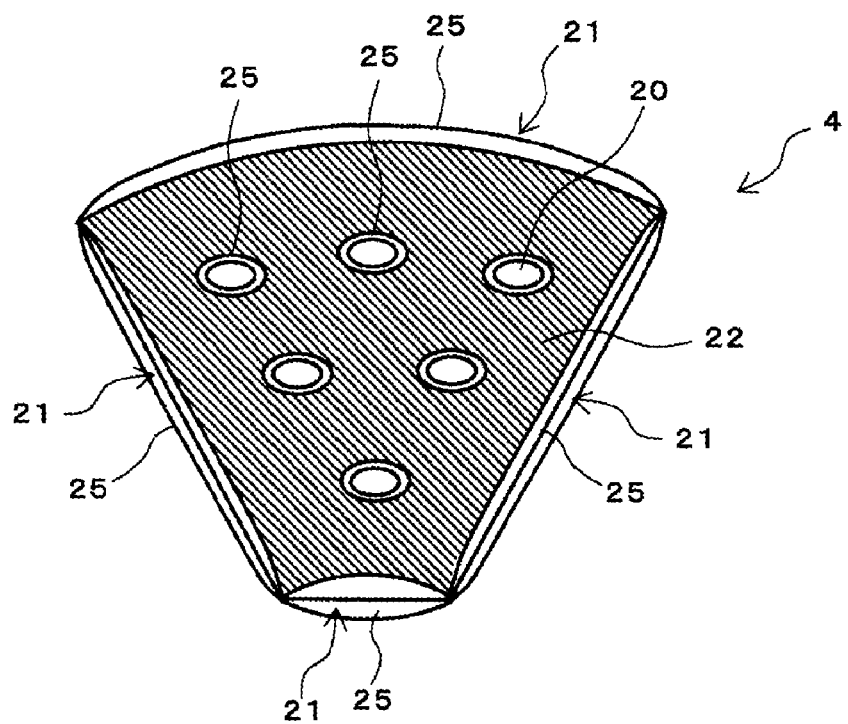
FIG. 4 is a perspective view showing an example of the reticulate contact body.

Then, characteristics of the process for manufacturing the reticulate contact body element according to the present invention are explained based on FIG. 3 and FIG. 4. First, the periphery 21 of the aforementioned reticulate contact body element precursor 2 and the circumferences of the aforementioned through holes 20 are compressed into flat shapes and welded with the hot press machine to form compression sections 25.

Simultaneously with or subsequently to the formation of the compression sections 25, the whole face 22 of the aforementioned reticulate contact body element precursor except its periphery 21 and the circumferences of the aforementioned through holes 20 is hot-pressed and processed with the hot press machine (see FIG. 3) to get the reticulate contact body element 4.

The process of forming the compression sections by compressing the periphery 21 of the aforementioned reticulate contact body element precursor 2 and the circumferences of the aforementioned through holes 20 with the hot press machine 3 is also adopted in the patent document 4 while what is characteristic of the present invention is to hot-press and process the whole face 22 of the aforementioned reticulate contact body element precursor 2 except its periphery 21 and the circumference of the aforementioned through holes 20 with the hot press machine 3 as shown in FIG. 3. Adoption of such a process produces the effect of making fiber yarn run-free and the rotating reticulate contact body gained from the reticulate contact body element 4 excellent in strength.

The temperature of the hot press machine at its surface contacting the synthetic yarn is adjusted preferably to the range of 90-140° C. and, more preferably, the range of 100-140° C. and, further preferably, the range of 120-140° C. in the present invention. If the temperature is less than 90° C., the tensile strength will decline unfavorably and if it exceeds 140° C., the fiber yarn may melt unfavorably.

The void of the reticulate contact body element after hot-pressed is preferably no less than 90% and no more than 98% and, more preferably, 92-97% and further preferably, 93-96%. Theoretically, the larger the contact surface area of the contact body is, the better the effect is, but the void becomes lower, resulting in degradation of oxygen supply capacity in the microorganism treatment and occurrence of the problem of plugging by sludge; therefore, the aforementioned range of void has been found out from the relation among the microorganism retention, treatment efficiency and strength.

In the present invention a rest period of no less than five days is provided after the aforementioned hot-pressing and processing process to promote crystallization of the thermally compressed synthetic fiber is finished. The rest period is preferably no less than eight days and no more than ten days.

It has been found that the rest period, which is given to promote crystallization of the thermally compressed synthetic fiber, is preferably set at a number of days within which the crystallization (annealing) develops completely to improve the strength of the rotating circular reticulate contact body as a product.

As used in the present invention, the rest broadly includes the action of moving products in addition to the move for transportation for shipment. If the rest period is less than five days, crystallization will not be complete and the tensile strength will be inferior.

The ratio between the yarn weight F of the reticulate contact body element and the weight L of the adhesive is preferably within the range of 50-60:50-40 in the present invention. This range of ratio produces an effect of contributing to improvement of the strength (particularly tensile strength) of the reticulate contact body element.

Now, the rotating circular reticulate contact body and the rotating circular reticulate contact body treatment apparatus using it are explained below.

Figure 5:
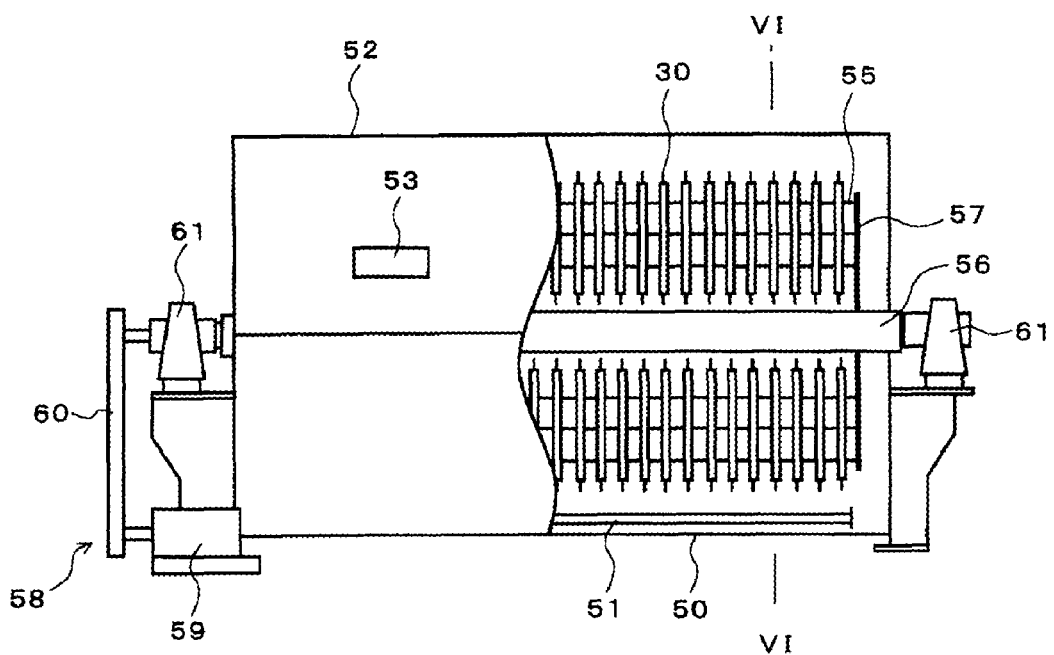
FIG. 5 is a schematic side elevation broken view of the principal part showing an example of the rotating circular reticulate contact body treatment apparatus using the rotating circular reticulate contact bodies provided by the present invention.
Figure 6:
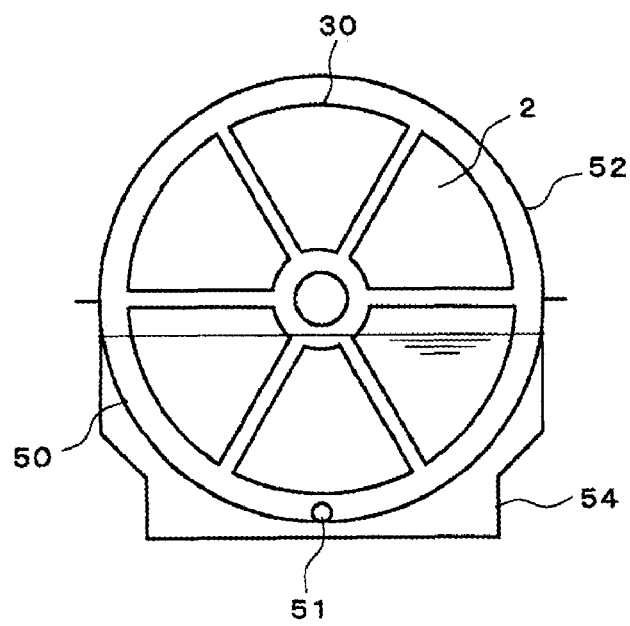
FIG. 6 is a schematic sectional view of the abovementioned apparatus taken along the line VI-VI.

FIG. 5 is a schematic side elevation broken view of the principal part showing an example of the rotating circular reticulate contact body treatment apparatus using the rotating circular reticulate contact body provided by the present invention, and FIG. 6 is a schematic sectional view of the abovementioned apparatus taken along the line VI-VI.

The rotating circular reticulate contact body provided by the present invention is obtained by combining a plurality of the reticulate contact body elements 2 obtained as abovementioned and assembling them into a circle. In the example shown in FIG. 6 six reticulate contact body elements 2 are combined and assembled into a circular rotating circular reticulate contact body 30.

50 shown in FIG. 6 is a contact tank, in which a certain liquid level is formed and the lower part of a plurality of rotating circular reticulate contact bodies 30 are soaked under the liquid level.

The bottom part of the contact tank 50 is provided with an aeration tube 51 that feeds air to each rotating circular reticulate contact body 30. The aeration tube 51 is connected to a blower, for example. The upper part of the contact tank 50 is provided with a cover 52, which may be provided with an inspection hole 53. 54 is a platform. The through holes 20 of the rotating circular reticulate contact bodies 30 have spacers 55 inserted, both ends of which are fixed on supporting plates 57 installed on the main shaft 56 at a right angle. This makes it possible to keep individual rotating circular reticulate contact bodies 30 spaced at a predetermined distance by the spacers 55, and thus a module consisting of a plurality of the rotating circular reticulate contact bodies 30 are formed. The main shaft 56 of the rotating circular reticulate contact bodies is connected to the driving source 58. The configuration of the driving source 58 is not especially defined; however it has a motor 59 with a reducer, a power transmission system 60 and bearings 61, for example.

As shown in FIG. 6, the aforementioned apparatus rotates with the rotating circular reticulate contact bodies 30 being soaked partly in liquid in the contact tank; therefore, if the yarn surfaces of the rotating circular reticulate contact bodies 30 have microorganisms attached, they decompose organic matter, and as biological conversion of the organic matter progresses, the microorganisms propagate and the microorganisms attaching to the yarn surfaces increase and treat organic matter in waste water continually. For embodiments of the treatment, Japanese Unexamined Patent application Publication 2001-79581 can be quoted.

EMBODIMENTS

The following embodiments will demonstrate the effects of the present invention:

Embodiment 1-4

A synthetic resin fiber block of 50 mm thick, 1000 mm wide and 2000 mm long was cut and processed into a reticular contact body element precursor as shown in FIG. 2, and 6 through holes were made therein.

The circumferences of the through holes, the periphery of the reticular contact body element precursor and the whole face of the reticular contact body element were hot-pressed with a hot press machine. The heating temperature was set at 140° C.

The tensile strength and ductility of the obtained reticular contact body element were measured after it was rested for 0 hour, 17 hours, 41 hours and 137 hours respectively based on JIS (L) 1096. Its bulk density was also measured. Table 1 shows the results of the measurement. The values in the table are averages of those obtained from three samples (n=3).

Reference Examples 1 and 2

A reticular contact body element was made in the same manner as shown in the embodiment 1, except that the whole face of the reticular contact body element precursor was not hot-pressed; then its tensile strength and ductility were measured after it was rested for 0 hours and 137 hours respectively. Its bulk density was also measured. Table 1 shows the results of the measurement. The values in the table are averages of those obtained from three samples (n=3).

TABLE 1

|   |   | Strength (N) | Ductility (%) | Bulk Density (g/cc) | Remarks |
|---|---|---|---|---|---|
| Embodiment 1 | Longitudinal | 107.7 | 67 | 0.059 | Heated |
|   | Lateral | 97.8 | 42.3 | 0.058 | 0 hours |
|   |   |   |   |   | n = 3 |
| Embodiment 2 | Longitudinal | 101.6 | 51.1 | 0.063 | after 17 hours |
|   | Lateral | 129.3 | 56 | 0.058 | n = 3 |

TABLE 1-continued

| | | Strength (N) | Ductility (%) | Bulk Density (g/cc) | Remarks |
|---|---|---|---|---|---|
| Embodiment 3 | Longitudinal | 114.8 | 55.2 | 0.062 | after 41 hours |
| | Lateral | 97.6 | 58.1 | 0.058 | n = 3 |
| Embodiment 4 | Longitudinal | 149.5 | 33.8 | 0.064 | after 137 hours |
| | Lateral | 168.2 | 40 | 0.064 | n = 3 |
| Reference 1 | Longitudinal | 94.2 | 72.6 | 0.059 | Non-heated |
| | Lateral | 87.4 | 56 | 0.055 | 0 hours n = 3 |
| Reference 2 | Longitudinal | 111.7 | 64.7 | 0.064 | after 137 hours |
| | Lateral | 117.8 | 57.3 | 0.064 | n = 3 |

Measurement temperature: 20° C.
Measurement velocity: 200 mm/min

The invention claimed is:

1. A method for manufacturing circular reticulate contact body element by cutting and processing a synthetic resin fiber block that is formed by gluing the intersections of fiber yarn formed in the shape of a three-dimensional reticulum comprising the steps of:
   cutting the synthetic resin fiber block to form fan shapes by dividing a disc-shaped body equally in radial direction forming fan shapes having a first face and a second face;
   making through holes from the first face to the second face in the fan-shaped reticulate contact body element precursor to insert spacers through;
   forming compression sections by compressing the periphery of the reticulate contact body element precursor and the circumferences of the through holes with a hot press machine;
   hot-pressing the first face and the second face of the reticulate contact body element precursor except its periphery and the circumferences of the through holes with the hot press machine at temperatures of 90-140° C. to make the void of the face of the reticulate contact body element precursor except its periphery and the circumferences of the through holes no less than 90% and no more than 98%; and
   promoting crystallization of the synthetic fiber by giving a rest period of no less than five days after the reticulate contact body element precursor has been hot-pressed.

2. The method for manufacturing the reticulate contact body element as set forth in claim 1, in which the temperature of the contact surface of the hot press machine for hot-pressing the first and second face of the reticulate contact body element precursor with the hot press machine is adjusted to 100-140° C.

3. The method for manufacturing the reticulate contact body element of claim 2 in which the ratio between the yarn weight F of the reticulate contact body element and the weight L of an adhesive is in the range of 50-60 to 50-40.

4. A rotating circular reticulate contact body comprising:
   a plurality of the reticulate contact body elements combined and assembled into a circle after being manufactured according to the method for manufacturing the reticulate contact body element of claim 3.

5. The method for manufacturing the reticulate contact body element of claim 2 in which the rest period is no less than eight days and no more than ten days.

6. A rotating circular reticulate contact body comprising:
   a plurality of the reticulate contact body elements combined and assembled into a circle after being manufactured according to the method for manufacturing the reticulate contact body element of claim 5.

7. A rotating circular reticulate contact body comprising:
   a plurality of the reticulate contact body elements combined and assembled into a circle after being manufactured according to the method for manufacturing the reticulate contact body element of claim 2.

8. The method for manufacturing the reticulate contact body element as set forth in claim 1, in which the temperature of the contact surface of the hot press machine for hot-pressing the first and second face of the reticulate contact body element precursor with the hot press machine is adjusted to 120-140° C.

9. The method for manufacturing the reticulate contact body element of claim 8 in which the ratio between the yarn weight F of the reticulate contact body element and the weight L of an adhesive is in the range of 50-60 to 50-40.

10. A rotating circular reticulate contact body comprising:
    a plurality of the reticulate contact body elements combined and assembled into a circle after being manufactured according to the method for manufacturing the reticulate contact body element of claim 9.

11. The method for manufacturing the reticulate contact body element of claim 8 in which the rest period is no less than eight days and no more than ten days.

12. A rotating circular reticulate contact body comprising:
    a plurality of the reticulate contact body elements combined and assembled into a circle after being manufactured according to the method for manufacturing the reticulate contact body element of claim 11.

13. A rotating circular reticulate contact body comprising:
    a plurality of the reticulate contact body elements combined and assembled into a circle after being manufactured according to the method for manufacturing the reticulate contact body element of claim 8.

14. The method for manufacturing the reticulate contact body element as set forth in claim 1 in which the ratio between the yarn weight F of the reticulate contact body element and the weight L of an adhesive is in the range of 50-60 to 50-40.

15. The method for manufacturing the reticulate contact body element of claim 14 in which the rest period is no less than eight days and no more than ten days.

16. A rotating circular reticulate contact body comprising:
    a plurality of the reticulate contact body elements combined and assembled into a circle after being manufactured according to the method for manufacturing the reticulate contact body element of claim 15.

17. A rotating circular reticulate contact body comprising:
    a plurality of the reticulate contact body elements combined and assembled into a circle after being manufactured according to the method for manufacturing the reticulate contact body element of claim 14.

18. The method for manufacturing the reticulate contact body element as set forth in claim 1 in which the rest period is no less than eight days and no more than ten days.

19. A rotating circular reticulate contact body comprising:
a plurality of the reticulate contact body elements combined and assembled into a circle after being manufactured according to the method for manufacturing the reticulate contact body element of claim 18.

20. A rotating circular reticulate contact body comprising:
a plurality of the reticulate contact body elements combined and assembled into a circle after being manufactured according to the method for manufacturing the reticulate contact body element as set forth in claim 1.

* * * * *